US009107182B2

(12) United States Patent
Kwun (10) Patent No.: US 9,107,182 B2
(45) Date of Patent: Aug. 11, 2015

(54) METHOD AND APPARATUS FOR ALLOCATING IDENTIFIER OF BASE STATION IN COMMUNICATION SYSTEM

(75) Inventor: Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 13/015,899

(22) Filed: Jan. 28, 2011

(65) Prior Publication Data

US 2011/0190000 A1 Aug. 4, 2011

(30) Foreign Application Priority Data

Feb. 1, 2010 (KR) ........................ 10-2010-0009197

(51) Int. Cl.
*H04W 72/00* (2009.01)

(52) U.S. Cl.
CPC .................................... *H04W 72/00* (2013.01)

(58) Field of Classification Search
CPC ................................................... H04W 72/04
USPC ........................................................ 370/328
See application file for complete search history.

(56) References Cited

U.S. PATENT DOCUMENTS

| | | | |
|---|---|---|---|
| 6,453,064 B1 * | 9/2002 | Aikawa et al. ................. | 382/154 |
| 8,160,590 B2 * | 4/2012 | Mueck et al. .................. | 455/444 |
| 2004/0121774 A1 * | 6/2004 | Rajkotia et al. ............... | 455/441 |
| 2004/0204097 A1 * | 10/2004 | Scheinert et al. ............. | 455/561 |
| 2006/0046709 A1 * | 3/2006 | Krumm et al. ............. | 455/422.1 |
| 2009/0047960 A1 * | 2/2009 | Gunnarsson et al. ......... | 455/436 |
| 2009/0129354 A1 * | 5/2009 | Gupta et al. ................... | 370/338 |
| 2009/0215452 A1 * | 8/2009 | Balasubramanian et al. | 455/434 |
| 2010/0144363 A1 * | 6/2010 | De Rosa et al. ............. | 455/452.1 |
| 2010/0167718 A1 * | 7/2010 | Chiussi et al. ............. | 455/422.1 |
| 2011/0059744 A1 * | 3/2011 | Won et al. ...................... | 455/450 |
| 2011/0149878 A1 * | 6/2011 | Ahmadi et al. ............... | 370/329 |
| 2011/0189999 A1 * | 8/2011 | Mueck ........................... | 455/450 |
| 2011/0243108 A1 * | 10/2011 | Park et al. ..................... | 370/336 |
| 2013/0150046 A1 * | 6/2013 | Gogic et al. .................. | 455/436 |

\* cited by examiner

*Primary Examiner* — Gerald Smarth
(74) *Attorney, Agent, or Firm* — Jefferson IP Law, LLP (57) ABSTRACT

An apparatus and method for allocating an identifier of a Base Station (BS) in a communication system are provided. The method includes determining a Physical Cell Identification (PCI) allocation range using Physical Cell Identifiers (PC-IDs) of adjacent macro BSs located within a predetermined distance from a target macro BS, the PCI allocation range including PCIDs substantially allocable to at least one micro BS installed in a service area of the target macro BS, determining a PCI broadcast range using the PCI allocation range, the PCI broadcast range including PCIDs exclusively allocated to the at least one micro BS, and broadcasting the PCI broadcast range to Mobile Stations (MSs) located in the service area.

26 Claims, 8 Drawing Sheets

FIG.7

METHOD AND APPARATUS FOR ALLOCATING IDENTIFIER OF BASE STATION IN COMMUNICATION SYSTEM

PRIORITY

This application claims the benefit under 35 U.S.C. §119(a) of a Korean patent application filed in the Korean Intellectual Property Office on Feb. 1, 2010 and assigned Serial No. 10-2010-0009197, the entire disclosure of which is hereby incorporated by reference.

BACKGROUND OF THE INVENTION

1. Field of the Invention

The present invention relates to a method and apparatus for controlling a communication system. More specifically, the present invention relates to an apparatus and method for allocating identifiers of Base Stations (BSs) in a communication system.

2. Description of the Related Art

In a general communication system, when seamless communication cannot be expected with only the installed existing macro BS, a micro BS, also known as a femto BS, that covers indoor radio shadow areas, is additionally installed to allow indoor Mobile Stations (MSs) to receive desired services over the micro BS, thereby improving the indoor call quality. The micro BS may be differentiated from the macro BS in that it has a smaller coverage and accesses a mobile communication core network using a broadband access network installed in the indoor environment such as a home or office.

Figure 1:
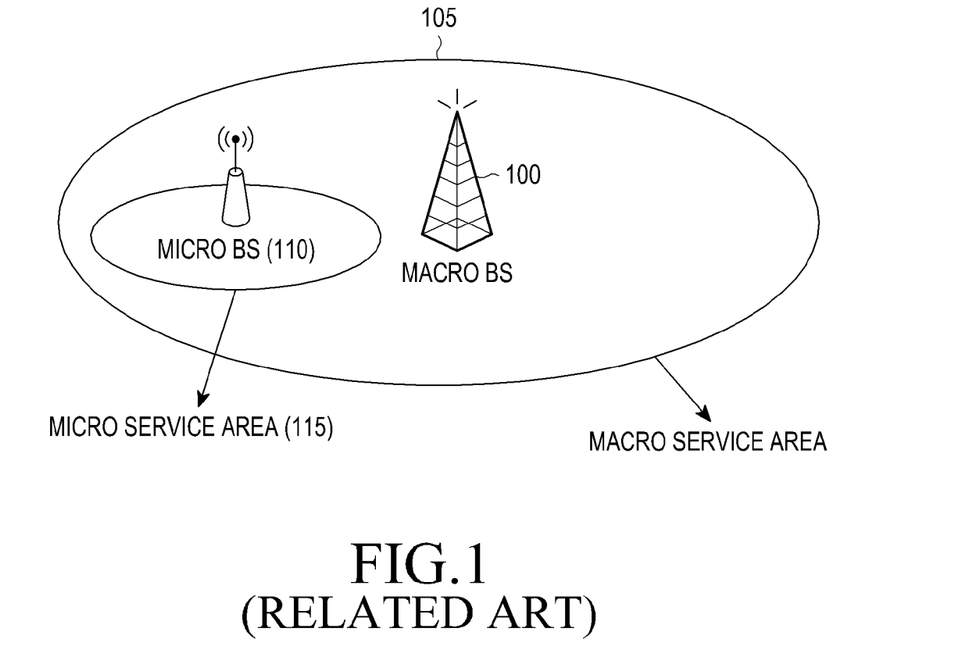
FIG. 1 illustrates an example of a micro BS in a communication system according to the related art.

FIG. 1 illustrates an example of a micro BS in a communication system according to the related art.

Referring to FIG. 1, a communication system includes a service area 115 of a micro BS 110 (hereinafter referred to as a 'micro service area'), which is a partial zone in a service area 105 of a macro BS 100 (hereinafter referred to as a 'macro service area'), which is a relatively large area.

In the communication system, BSs including the macro BSs and the micro BSs receive Physical Cell Identifiers (PC-IDs) from an upper-layer management system, and wirelessly transmit synchronization signals and reference signals corresponding to the allocated PCIDs. Then, an arbitrary MS may recognize the presence of its associated macro BS or micro BS by receiving the synchronization signal and the reference signal. Hence, an increase in the number of micro BSs installed in the macro service area may provoke the need for a plurality of PCIDs to distinguish the micro BSs.

However, the number of PCIDs allocable in the entire communication system is a fixed constant. More importantly, the number of PCIDs allocable to micro BSs is determined by excluding PCIDs to be allocated to macro BSs from all possible PCIDs. Therefore, considering the fact that micro service areas are relatively small, a communication service provider, also known as a mobile carrier, reuses allocated PCIDs in a certain distance when the allocable PCIDs are all consumed due to an increase in the number of micro BSs installed in its macro service area. However, when micro BSs reuse the allocated PCIDs, the distances between the micro BSs using the same PCIDs may be undesirably short in the areas where the number of installed micro BSs rapidly increases, for example, in residential areas and commercial areas.

Therefore, Physical Cell Identification (PCI) collision may occur. That is, an arbitrary MS may not be able to distinguish between signals received from two or more micro BSs sharing the same PCID. In this case, installing micro BSs in a related macro service area may be restricted. Accordingly, there is a need for a method and apparatus for efficiently allocating PCIDs in a communication system including micro BSs.

SUMMARY OF THE INVENTION

An aspect of the present invention is to address at least the above-mentioned problems and/or disadvantages and to provide at least the advantages described below. Accordingly, an aspect of the present invention is to provide a method for setting a different number of Physical Cell Identifiers (PC-IDs) exclusively allocable to micro BSs installed in a macro service area according to the cell or regional characteristics in a communication system.

Another aspect of the present invention is to provide a method for setting the different number of PCIDs exclusively allocable to micro BSs according to the number of micro BSs installed in a macro service area.

In accordance with an aspect of the present invention, a method for allocating an identifier of a Base Station (BS) in a communication system is provided. The method includes determining a Physical Cell Identification (PCI) allocation range using PCIDs of adjacent macro BSs located within a predetermined distance from a target macro BS, the PCI allocation range including PCIDs substantially allocable to at least one micro BS installed in a service area of the target macro BS, determining a PCI broadcast range using the PCI allocation range, the PCI broadcast range including PCIDs exclusively allocated to the at least one micro BS, and broadcasting the PCI broadcast range to Mobile Stations (MSs) located in the service area.

In accordance with another aspect of the present invention, an apparatus for allocating an identifier of a BS in a communication system is provided. The apparatus includes a controller for determining a PCI allocation range using PCIDs of adjacent macro BSs located within a predetermined distance from a target macro BS, the PCI allocation range including PCIDs substantially allocable to at least one micro BS installed in a service area of the target macro BS, and for determining a PCI broadcast range using the PCI allocation range, the PCI broadcast range including PCIDs exclusively allocated to the at least one micro BS, and a transmitter for transmitting the PCI broadcast range to MSs located in the service area, under control of the controller.

In accordance with further another aspect of the present invention, a method for allocating an identifier of a BS in a communication system is provided. The method includes receiving a PCI allocation range, which is determined using a maximum value among PCIDs of adjacent macro BSs located within a predetermined distance from a target macro BS and includes PCIDs substantially allocable to at least one micro BS installed in a service area of the target macro BS, selecting a PCID exclusively allocated to the at least one micro BS, from among the PCIDs included in the PCI allocation range, and transmitting the selected PCID to the at least one micro BS.

In accordance with yet another aspect of the present invention, an apparatus for allocating an identifier of a BS in a communication system is provided. The apparatus includes a receiver for receiving a PCI allocation range, which is determined using a maximum value among PCIDs of adjacent macro BSs located within a predetermined distance from a target macro BS and includes PCIDs substantially allocable to at least one micro BS installed in a service area of the target macro BS, a controller for selecting a PCID exclusively allocated to the at least one micro BS, from among the PCIDs included in the PCI allocation range, and a transmitter for transmitting the selected PCID to the at least one micro BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for setting the different number of Physical Cell Identifiers (PCIDs) exclusively allocable to micro BSs installed in a related macro service area according to the cell or regional characteristics in a communication system.

The micro BSs are divided into an Open Subscriber Group (OSG) access type and a Closed Subscriber Group (CSG) access type according to the methods by which Mobile Stations (MSs), also known as subscribers, may have access. To an OSG access-type BS (hereinafter referred to as an 'OSG BS'), all MSs having subscribed to its communication service provider can have access, whereas to a CSG access-type BS (hereinafter referred to as a 'CSG BS'), only a subscriber group or MS group consisting of the MSs pre-specified through negotiations between its communication service provider and an owner of the micro BS can have access. Therefore, an MS desiring to use the CSG BS (hereinafter referred to as a 'CSG MS') previously stores information about accessible CSG BSs, for example, CSG BS IDs, in a storage device in the CSG MS in the form of a whitelist.

Upon detecting a CSG BS, the CSG MS determines accessibility of the detected CSG BS using the whitelist. If the detected CSG BS is an accessible BS, the CSG MS requests access to the detected CSG BS.

An MS having no accessible CSG BSs (hereinafter referred to as a 'non-CSG MS') maintains its whitelist in a null state.

In a cell search process or a process of scanning adjacent BSs, a CSG MS determines whether an arbitrary BS is an accessible CSG BS, and should perform an additional process if the arbitrary BS is an accessible CSG BS. For these reasons, PCIDs exclusively used only by CSG BSs (hereinafter referred to as 'CSG PCIDs') are allocated so that an MS may determine that an arbitrary BS is a CSG BS with only a PCID. In other words, a CSG PCID-dedicated allocation range including a set of PCIDs allocated only as CSG PCIDs is separated in the entire PCID allocation range allocable in the communication system. Further, in the communication system, each of macro BSs broadcasts PCID separation information including 'information about the entire PCID allocation range' and 'information about the CSG PCID-dedicated allocation range' to MSs located in its macro service area.

For example, in a Long Term Evolution (LTE) system, each of macro BSs (or macro Node Bs) provides the PCID separation information to MSs (or User Equipments (UEs)) located in its service area using a csg-PhysCellIdRange Information Element (IE) in a System Information Block (SIB) #4. While a CSG BS may transmit the csg-PhysCellIdRange IE to all MSs, a macro BS may transmit the csg-PhysCellIdRange IE to MSs selectively. An MS receives an SIB #4 in an idle state, and since a csg-PhysCellIdRange IE received once is valid for 24 hours, this IE is less flexible than other IEs in an RRC message, which are valid for three hours.

Upon detecting an arbitrary BS, an arbitrary MS determines whether the detected BS is a CSG BS, using the information about the CSG PCID-dedicated allocation range and a PCID of the detected BS.

Figure 2:
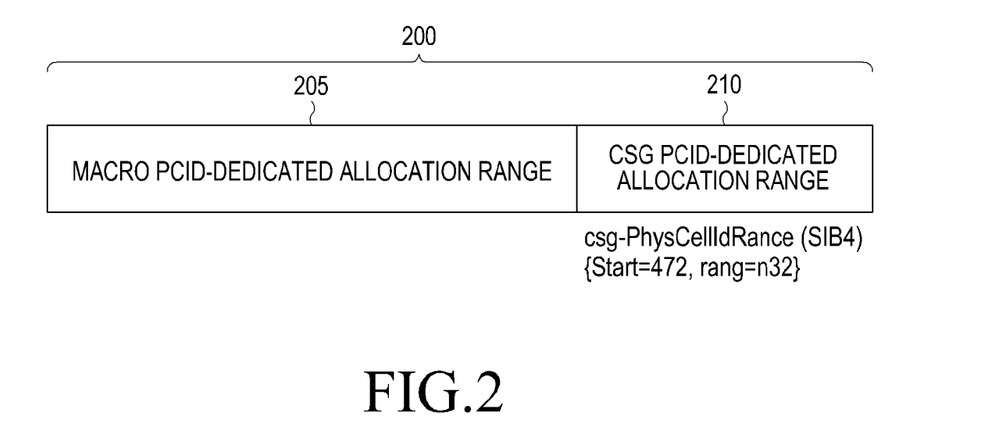
FIG. 2 illustrates a Closed Subscriber Group Physical Cell Identifier (CSG PCID)-dedicated allocation range in the entire PCID allocation range including all PCIDs allocable in a communication system according to an exemplary embodiment of the present invention.

FIG. 2 illustrates a CSG PCID-dedicated allocation range in an entire PCID allocation range including all PCIDs allocable in a communication system according to an exemplary embodiment of the present invention.

Referring to FIG. 2, an entire PCID allocation range 200 allocable in a communication system includes a total of 504 PCIDs #0 to #503. In the entire PCID allocation range 200, 32 PCIDs #472 to #503 are allocated as a CSG PCID-dedicated allocation range 210 to be allocated as dedicated PCIDs for CSG BSs. In the entire PCID allocation range 200, the remaining PCIDs #0 to #471 except for the PCIDs included in the CSG PCID-dedicated allocation range 210 are allocated as a macro PCID-dedicated allocation range 205 to be allocated as dedicated PCIDs for macro BSs (hereinafter referred to as 'macro PCIDs').

As to information about the CSG PCID-dedicated allocation range 210, a serving macro BS broadcasts it as system information to MSs located in its service area.

For example, assume that an MS has detected a PCID #490 in a process of searching for adjacent macro BSs. Having already received the information about the CSG PCID-dedicated allocation range 210, included in the system information broadcasted from the serving macro BS, the MS recognizes that a BS corresponding to the detected PCID is a CSG BS, by determining that the detected PCID is included in, or falls within, the CSG PCID-dedicated allocation range 210.

Figure 3:
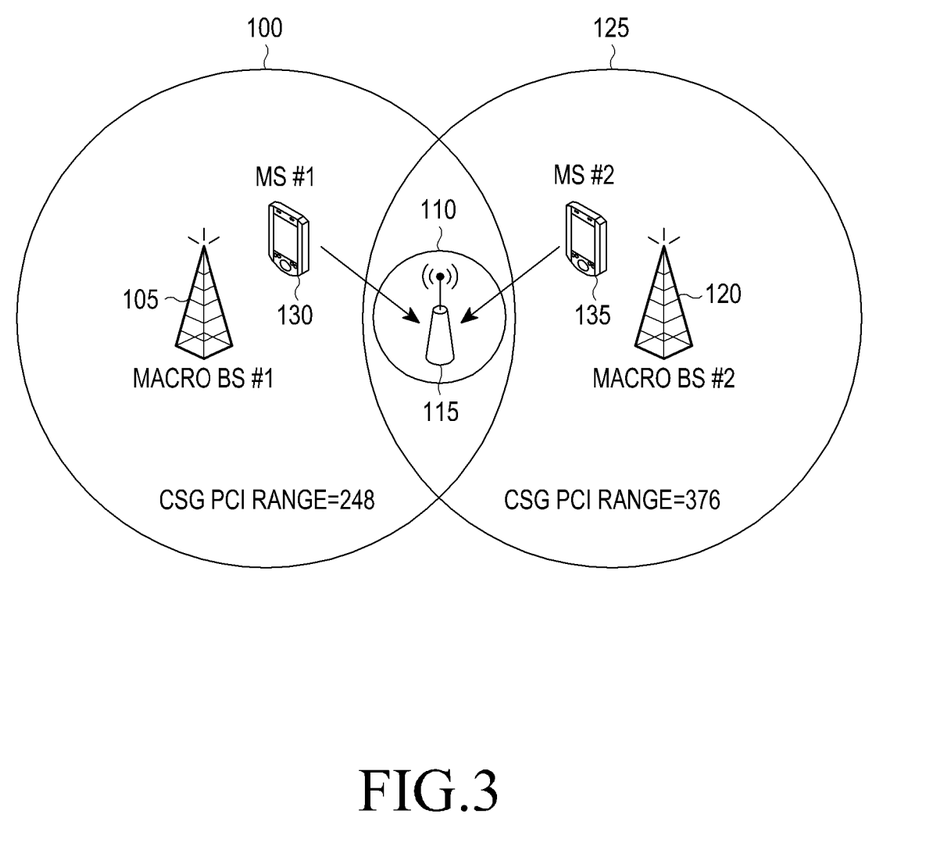
FIG. 3 illustrates different CSG PCID-dedicated allocation regions allocated for macro service areas individually according to an exemplary embodiment of the present invention.

FIG. 3 illustrates different CSG PCID-dedicated allocation regions allocated for macro service areas individually according to an exemplary embodiment of the present invention.

Referring to FIG. 3, for example an entire PCID allocation range 200 including 504 PCIDs #0 to #503 based on FIG. 2, a macro BS #1 105 serving a macro service area #1 100 allocates 256 PCIDs following a PCID #248 as its CSG PCID-dedicated allocation region, while a macro BS #2 120 serving a macro service area #2 125 allocates 128 PCIDs succeeding a PCID #376 as its CSG PCID-dedicated allocation region. Assume that a micro BS 115, located in an area where the macro BS coverage (or service area) #1 100 overlaps the macro BS coverage #2 125, is a CSG BS and is allocated from the macro BS #1 105 a PCID #350 included in the CSG PCID-dedicated allocation region set by the macro BS #1 105. An MS #1 130 and an MS #2 135, which are located in the macro service area #1 100 and the macro service area #2 125, respectively, are entering a micro service area 110 of the micro BS 115. The macro BS #1 105 and the macro BS #2 120 have transmitted CSG PCI ranges '248' and '376' for indicating start values of their CSG PCID-dedicated allocation regions, to the MS #1 130 and the MS #2 135 in advance, respectively.

If different csg-PhysCellIdRange values are merely allocated arbitrarily to cells individually as in FIG. 3, an MS located in the overlapping area between two macro BSs may malfunction in a process of recognizing a micro BS.

For example, assume that the MS #1 130 is a CSG MS. In this case, the MS #1 130 recognizes that the micro BS 115 is a CSG BS, by checking a PCID of the micro BS 115 based on the CSG PCI range=248 received in advance from the macro BS #1 105. The MS #1 130 determines its accessibility to the micro BS 115 by additionally reading an SIB of the micro BS 115. If accessible, the MS #1 130 sends the macro BS #1 105 a request for handover to the micro BS 115. However, if inaccessible, the MS #1 130 disregards the measurement result on the micro BS 115. In another example, if the MS #1 130 is a non-CSG MS, the MS #1 130 does not perform the SIB reading procedure because it cannot access the micro BS 115, which is a CSG BS. As a result, the MS #1 130 normally operates with respect to the micro BS 115.

On the contrary, the MS #2 135 recognizes the micro BS 115 as a macro BS by checking a PCID of the micro BS 115 based on the CSG PCI range=376 received in advance from the macro BS #2 120.

In the case where the MS #2 135 is a non-CSG MS, even though the MS #2 135 is an MS incapable of accessing the micro BS 115, the MS #2 135 sends an unnecessary handover request to the micro BS 115. Eventually, the MS #2 135 fails in the handover because of the impossibility of its CSG access to the micro BS 115. In the case where the MS #2 135 is a CSG MS, the MS #2 135 sends a handover request to the micro BS 115 without the SIB reading procedure, because the MS #2 135 has recognized the micro BS 115 as a macro BS using PCI=350, without knowing that the micro BS 115 is a CSG BS. Because of this, an incorrect handover request may be received at another adjacent macro BS using PCI=350. Therefore, the MS #2 135 may not be guaranteed to perform normal handover to the micro BS 115 even though the MS #2 135 is in a state where it can access the micro BS 115.

As described above, in the case where different csg-PhysCellIdRange values are merely allocated arbitrarily to macro BSs individually, malfunction of an MS may occur, and an increase in the number of CSG BSs installed in the macro service area leads to an increase in the occurrence of the malfunction, significantly affecting the normal communication between the MS and the BSs. Therefore, exemplary embodiments of the present invention provide a method for determining CSG PCID-dedicated allocation regions for macro BSs individually, taking into account the number of CSG BSs installed in their macro service areas.

More specifically, the CSG PCID-dedicated allocation regions may be determined through the following five steps. Herein, a CSG PCI allocation range refers to a set of CSG PCIDs substantially allocable to CSG BSs. That is, the CSG PCI allocation range is determined as the remaining PCIDs except for PCIDs to be allocated to macro BSs among all PCIDs allocable in the communication system. In addition, a CSG PCI broadcast range refers to a CSG PCID-dedicated allocation range that a serving macro BS transmits to an MS so that the MS located in its service area may identify the serving macro BS as a CSG BS using a PCID of the BS, and the CSG PCI broadcast range is transmitted to MSs as system information. The CSG PCI allocation range may be determined by an Element Management Server (EMS) managing macro BSs (hereinafter referred to as a 'macro EMS') and delivered to a relevant macro BS, or may be determined by a relevant macro BS and transmitted to the macro EMS.

Step 1: a process of collecting PCIDs of adjacent macro BSs.

Step 2: a process of determining a CSG PCI allocation range.

Step 3: a process of determining a CSG PCI broadcast range.

Step 4: a process of reporting a CSG PCI allocation range to an EMS managing micro BSs including CSG BSs (hereinafter referred to as a 'micro EMS').

Step 5: a process of reporting a CSG PCI broadcast range to macro BSs and a process of transmitting system information of macro BSs.

According to exemplary embodiments of the present invention, an EMS managing macro BSs (hereinafter referred to as a 'macro EMS') determines a macro PCID-dedicated allocation range allocated to macro BSs, and transmits the determined macro PCID-dedicated allocation range to a micro EMS managing micro BSs. Then the micro EMS allocates a PCID of a relevant CSG BS, using the remaining PCIDs except for the macro PCID-dedicated allocation range among the PCIDs allocable in the entire communication system. For example, it is assumed herein that a macro EMS determines a CSG PCI allocation range. However, the present invention may be applied even to the case where a macro BS determines the CSG PCI allocation range.

Step 1: Process of Collecting Macro PCIDs of Adjacent Macro BSs

A macro EMS first determines usage of PCIDs being used by macro BSs located within N tiers from a target macro BS (hereinafter referred to as 'adjacent macro BSs'). As for the usage of PCIDs of the adjacent macro BSs, the values stored by the macro EMS in advance may be used, or the values that the target macro BS has newly collected from MSs located in its service area using an Over The Air (OTA) algorithm, may be used.

More specifically, the macro EMS collects PCIDs of adjacent macro BSs located within one tier from the target macro BS, and then collects again PCID information of adjacent macro BSs located with one tier from each of the adjacent macro BSs located within one tier from the target macro BS. By repeating the above process N times, the macro EMS determines PCID information used in the adjacent macro BSs located within N tiers from the target macro BS. For example, it is assumed herein that the macro EMS collects PCIDs of macro BSs located within two tiers from the target macro BS.

Step 2: Process of Determining CSG PCI Allocation Range

The macro EMS checks an adjacent macro BS having the maximum PCID among the PCIDs of adjacent macro BSs located within two tiers from the target macro BS, which were collected in Step 1, and determines the maximum PCID value as a start value of a CSG PCI allocation range of the target macro BS, as defined in Equation (1) below.

$$\text{CSG PCI Allocation Range} = \text{MAX}(\text{PCID}_{Adjacent\ Macro_N}) \sim 503 \quad (1)$$

where $\text{PCID}_{Adjacent\ Macro_N}$ represents a PCID of an adjacent macro BS of a target macro BS, and N represents an index of the adjacent macro BS.

Step 3: Process of Determining CSG PCI Broadcast Range

The macro EMS determines a CSG PCI allocation range for each of adjacent BSs located within one tier from the target macro BS in the same manner as that performed in Step 2. The macro EMS detects an adjacent macro BS having the minimum PCID among the PCIDs included in the CSG PCI allocation range for each of the adjacent BSs located within one tier from the target macro BS. The macro EMS determines the minimum PCID value as a start value of a CSG PCI broadcast range of the target macro BS, as defined in Equation (2) below.

$$\text{CSG PCI Broadcast Range} = \text{Min}(\text{CSG PCI Allocation Range}_{Adjacent\ Macro_N}) \sim 503 \quad (2)$$

where $\text{CSG PCI Allocation Range}_{Adjacent\ Macro_N}$ represents a CSG PCI allocation range of an adjacent macro BS #N.

If the detected minimum value is less than the minimum value among the PCIDs included in the CSG PCI allocation range of the target macro BS, the macro EMS allocates PCIDs of CSG BSs located in a service area of the target macro BS, among the PCIDs included in the CSG PCI allocation range. However, the values that the target macro BS transmits to MSs located in its service area, as system information, are the CSG PCI broadcast range.

If the detected minimum value exceeds the maximum value among the PCIDs included in the CSG PCI allocation range of the target macro BS, the macro EMS sets the CSG PCI broadcast range as the CSG PCI allocation range.

Step 4: Process of Reporting CSG PCI Allocation Range to Micro EMS

The macro EMS transmits information about a CSG PCI allocation range of the target macro BS to a micro EMS. Then the micro EMS selects PCIDs of CSG BSs located in a service area of the target macro BS, among the PCIDs included in the CSG PCI allocation range.

Step 5: Process of Reporting CSG PCI Broadcast Range to Target Macro BS, and Process of Transmitting System Information of Macro BS The macro EMS transmits information about the CSG PCI broadcast range determined in Step 3, to the target macro BS. Then the target macro BS transmits system information including the CSG PCI broadcast range to MSs located in its service area. In the conventional method, the system information is transmitted using an SIB #4 that an MS in an idle mode can receive. However, in exemplary embodiments of the present invention, when transmitting system information to MSs located in its service area, a macro BS adds a CSG PCI broadcast range IE newly proposed by the present invention to at least one of a Main Information Block (MIB), an SIB #1, and an SIB #2 that an MS in an active mode should always receive. In this case, if different CSG PCI broadcast ranges are allocated for macro BSs individually, the CSG PCI broadcast ranges of the macro BSs may be changed to a period which is shorter than the existing 12-hour period. By doing so, it is possible to more dynamically change CSG PCIDs for macro BSs individually. In another exemplary embodiment of the present invention, a new SIB other than the existing SIB #a may be defined and the CSG PCI broadcast range may be transmitted in the new SIB. The SIB #a is characterized such that an MS in an active mode should always receive it.

Figure 4:
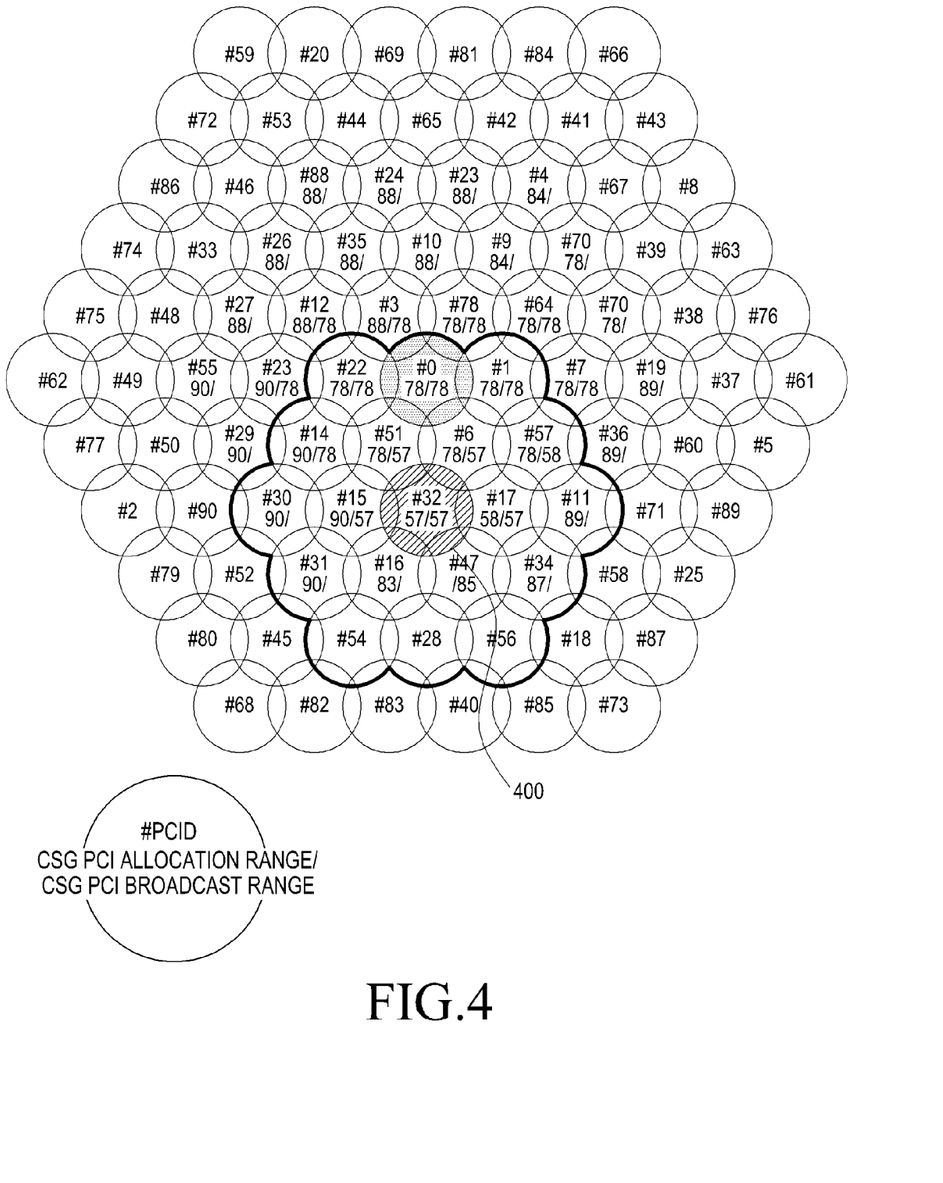
FIG. 4 illustrates a method for determining a CSG Physical Cell Identification (PCI) allocation range according to an exemplary embodiment of the present invention.

FIG. 4 illustrates a method for determining a CSG PCI allocation range according to an exemplary embodiment of the present invention.

Referring to FIG. 4, shown is an area where 91 macro BSs are installed that use PCIDs #0 to #90 among all PCIDs allocable in a communication system. '#N' (where N is a number) of each BS represents a PCID of a macro BS, which is allocated in its service area, and in 'N/N', the former N represents a start value of a CSG PCI allocation range of a relevant service area, and the latter N represents a start value of a CSG PCI broadcast range of a relevant service area. For example, it is assumed that each of the CSG PCI allocation range and the CSG PCI broadcast range includes PCIDs #N to #503, where N is a start value of the related range.

In the case where PCIDs of CSG BSs located in the above area are allocated according to the conventional method, since up to a PCID #90 has been allocated to a macro BS in this area, 91 PCIDs #0 to #90 cannot be allocated to CSG BSs located in this area.

On the other hand, if a CSG PCI allocation range is determined according to Steps 1 to 3 described above, a significant number of macro BSs located in this area may additionally allocate the PCIDs #0 to #90 to CSG BSs located in their service areas. For example, assume that a range of adjacent macro BSs of a service area 400 of a macro BS using a PCID #32 is two tiers. In this case, if PCIDs of adjacent macro BSs located within the two tiers from the macro BS with the PCID #32 are checked, a PCID with the maximum value is a PCID #57. Then, a start value of a CSG PCI allocation range for the service area 400 of the macro BS using the PCID #32 is determined as '57'. In other words, CSG BSs located in the service area 400 of the macro BS using the PCID #32 may be allocated PCIDs #N, where N is a number succeeding the maximum value '57'. By allocating different CSG PCID allocation ranges for macro BSs individually based on PCIDs of adjacent macro BSs as described above, the number of PCIDs allocable to CSG BSs without malfunction of MSs may be increased. Therefore, the number of CSG BSs accommodable in individual service areas increases in proportion to the increased number of allocable PCIDs of CSG BSs, for individual macro BSs.

Figure 5A:
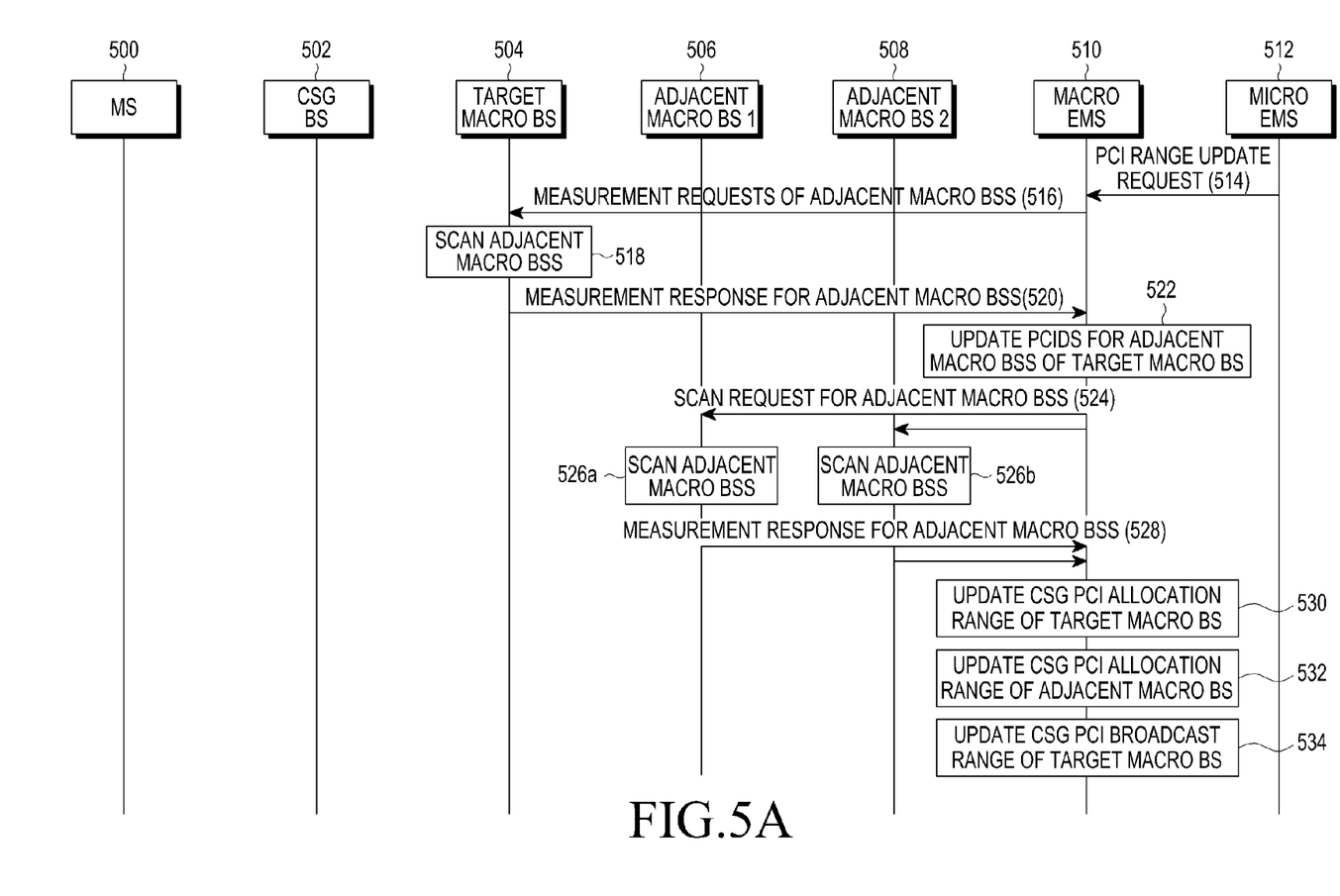
FIGS. 5A and 5B illustrate an operation of determining a CSG PCI allocation range by a macro Element Management Server (EMS) in a communication system according to an exemplary embodiment of the present invention.
Figure 5B:
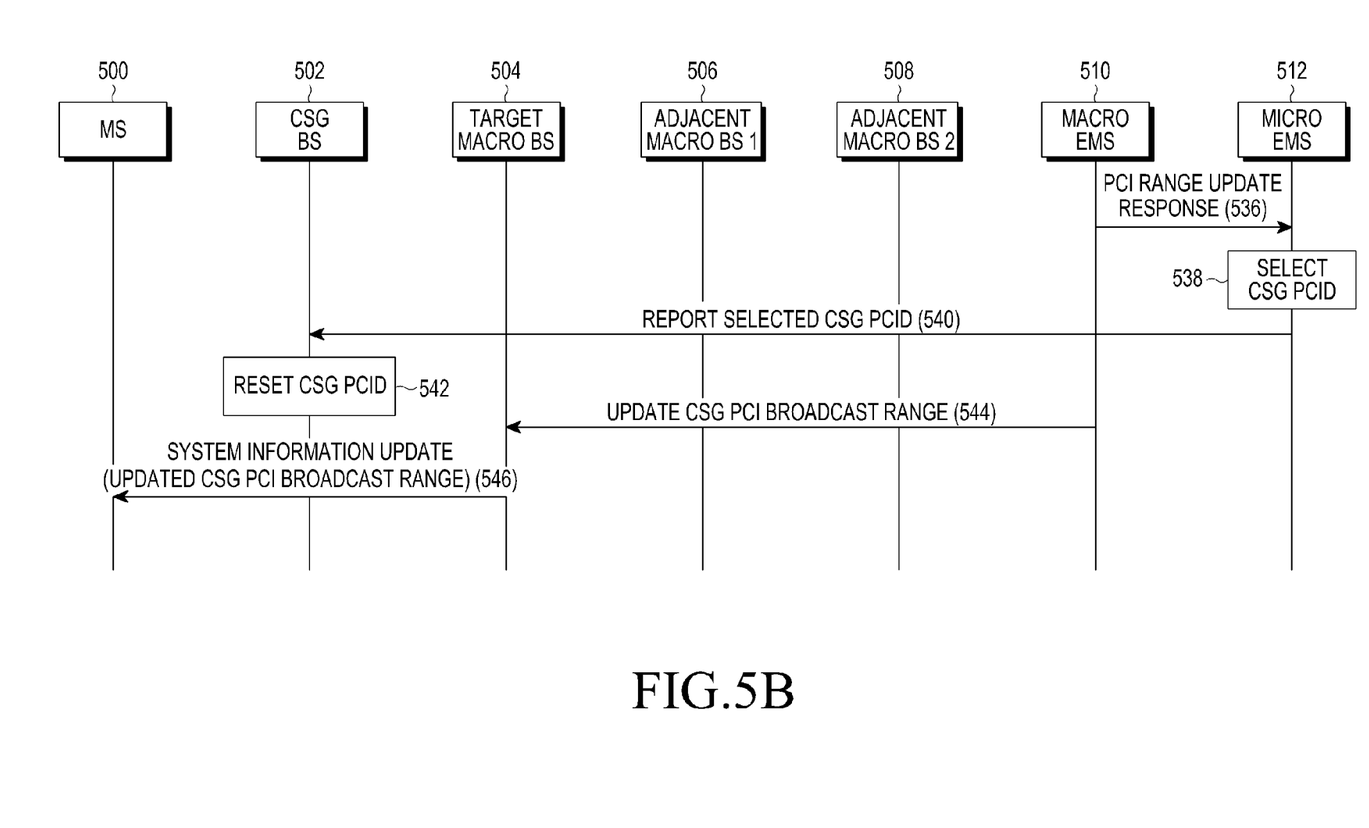

FIGS. 5A and 5B illustrate an operation of determining a CSG PCI allocation range by a macro EMS in a communication system according to an exemplary embodiment of the present invention.

Referring to FIGS. 5A and 5B, a communication system includes a target macro BS 504, a CSG BS 502 installed in a macro service area of the target macro BS 504, an MS 500 located in a service area of the CSG BS 502, adjacent macro BSs #1 and #2 506 and 508 of the target macro BS 504, a macro EMS 510, and a micro EMS 512. Although only the adjacent macro BSs #1 and #2 506 and 508 are illustrated herein as adjacent macro BSs of the target macro BS 504 by way of example, the number of scanned adjacent macro BSs of the target macro BS 504 is subject to change.

In step 514, to select a PCID of the CSG BS 502, the micro EMS 512 sends the macro EMS 510 a PCI range update request message for requesting update of a CSG PCI allocation range and a CSG PCI broadcast range of the target macro BS 504. Upon receiving the PCI range update request message, the macro EMS 510 sends the target macro BS 504 measurement requests of adjacent macro BSs for the target macro BS 504 in step 516. Then, the target macro BS 504 scans its adjacent macro BSs in step 518, and sends the macro EMS 510 a measurement response for adjacent macro BSs, including information about the scanned adjacent macro BSs #1 and #2 506 and 508 in step 520. The information about the adjacent macro BSs #1 and #2 506 and 508 includes macro PCIDs of the adjacent macro BSs #1 and #2 506 and 508.

In step 522, the macro EMS 510 stores the adjacent macro BSs #1 and #2 506 and 508 as adjacent macro BSs of the target macro BS 504, and updates PCIDs of the adjacent macro BSs #1 and #2 506 and 508. In step 524, the macro EMS 510 sends to each of the adjacent macro BSs #1 and #2 506 and 508, a message for requesting to scan their adjacent macro BSs. Then the adjacent macro BSs #1 and #2 506 and 508 scan their adjacent macro BSs in steps 526*a* and 526*b*, respectively, and send the macro EMS 510 measurement responses for adjacent macro BSs, including macro PCIDs of the adjacent macro BSs, in step 528.

In step 530, the macro EMS 510 updates the CSG PCI allocation range of the target macro BS 504 according to Step 2, using the macro PCIDs of adjacent macro BSs for the adjacent macro BSs #1 and #2 506 and 508. In step 532, the macro EMS 510 updates CSG PCI allocation ranges of the adjacent macro BSs #1 and #2 506 and 508 according to Step 2, using the PCIDs of adjacent macro BSs for the adjacent macro BSs #1 and #2 506 and 508. In step 534, the macro EMS 510 updates a CSG PCI broadcast range of the target macro BS 504 according to Step 3, using the updated CSG PCI allocation range of the target macro BS 504 and the updated CSG PCI allocation ranges of the adjacent macro BSs #1 and #2 506 and 508. In step 536, the macro EMS 510 sends the micro EMS 512 a PCI range update response indicating that the CSG PCI allocation range and the CSG PCI broadcast range of the target macro BS 504 have been updated.

In step 538, the micro EMS 512 selects one of the PCIDs included in the updated CSG PCI allocation range, as a CSG PCID of the CSG BS 502. In step 540, the micro EMS 512 reports the selected CSG PCID to the CSG BS 502. In step 542, the CSG BS 502 resets its CSG PCID to the selected CSG PCID.

In step 544, the macro EMS 510 transmits the updated CSG PCI broadcast range to the target macro BS 504. In step 546, the target macro BS 504 transmits the updated CSG PCI broadcast range information to the MS 500 as system information.

Figure 6A:
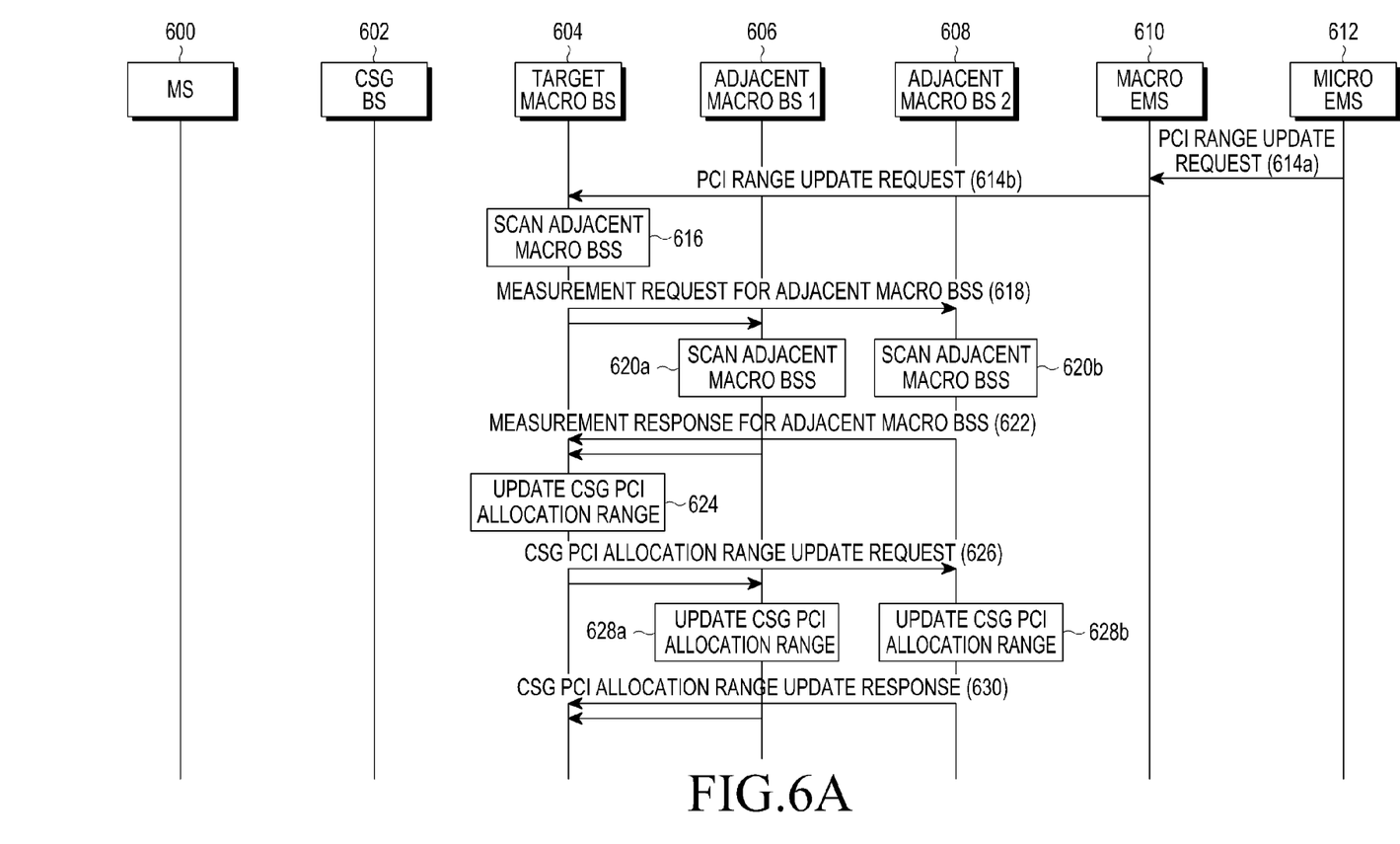
FIGS. 6A and 6B illustrate a macro BS's operation of determining a CSG PCI allocation range and reporting the determined CSG PCI allocation range to a macro EMS in a communication system according to an exemplary embodiment of the present invention.
Figure 6B:
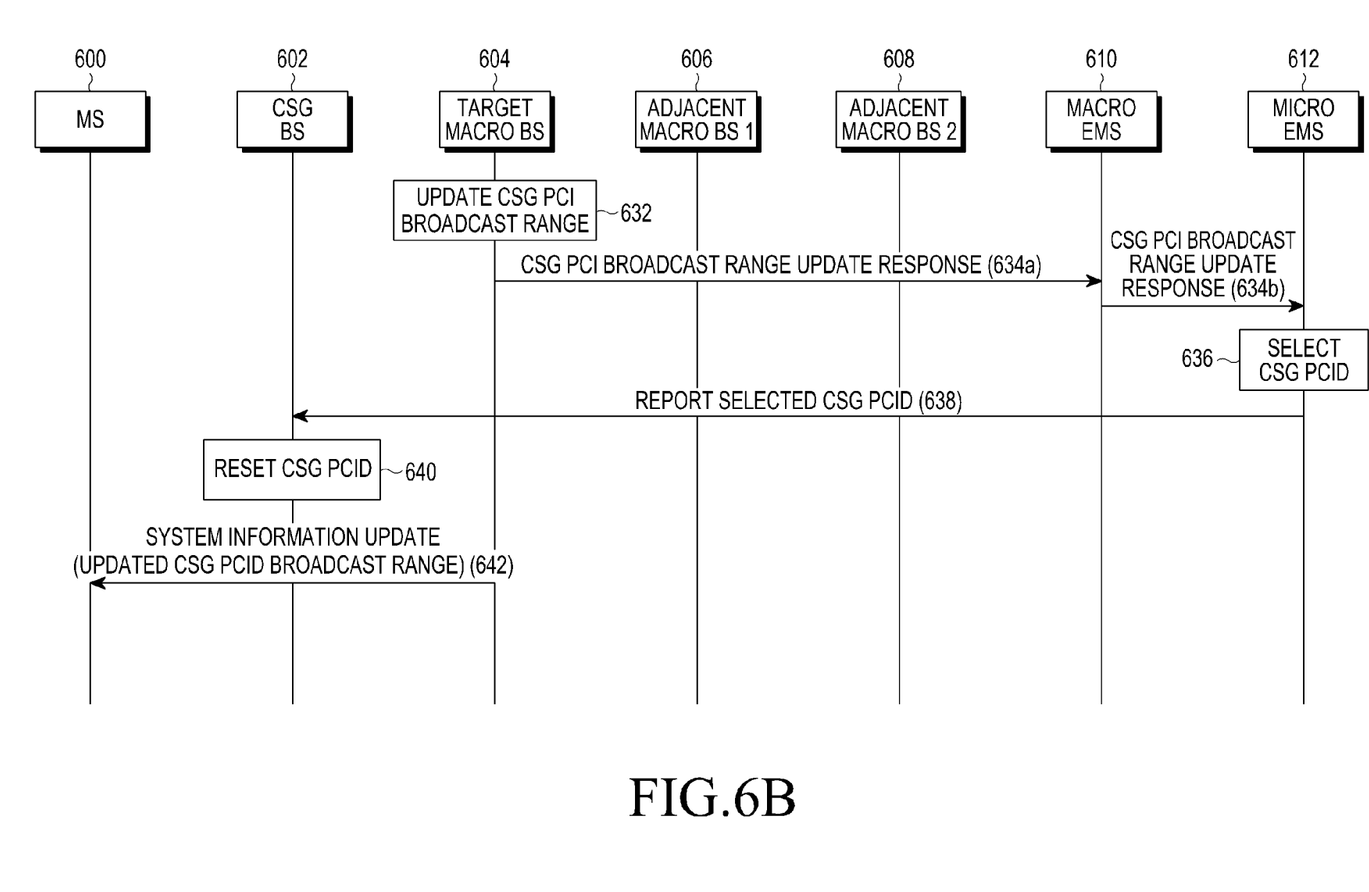

FIGS. 6A and 6B illustrate a macro BS's operation of determining a CSG PCI allocation range and reporting the determined CSG PCI allocation range to a macro EMS in a communication system according to an exemplary embodiment of the present invention.

Referring to FIGS. 6A and 6B, a communication system includes a target macro BS 604, a CSG BS 602 installed in a macro service area of the target macro BS 604, an MS 600 located in a service area of the CSG BS 602, adjacent macro BSs #1 and #2 606 and 608 of the target macro BS 604, a macro EMS 610, and a micro EMS 612. Although only the adjacent macro BSs #1 and #2 606 and 608 are illustrated herein as adjacent macro BSs of the target macro BS 604 by way of example, the number of scanned adjacent macro BSs of the target macro BS 604 is subject to change.

In steps 614*a* and 614*b*, to select a PCID of the CSG BS 602, the micro EMS 612 sends a PCI range update request message for requesting update of a CSG PCI allocation range and a CSG PCI broadcast range of the target macro BS 604, to the target macro BS 604 through the macro EMS 610.

Upon receiving the PCI range update request message, the target macro BS 604 scans its adjacent macro BSs in step 616, and sends measurement requests of adjacent macro BSs for the adjacent macro BSs #1 and #2 606 and 608 to the scanned adjacent macro BSs #1 and #2 606 and 608 in step 618. In steps 620*a* and 620*b*, the adjacent macro BSs #1 and #2 606 and 608 scan their adjacent macro BSs. In step 622, the adjacent macro BSs #1 and #2 606 and 608 send the target macro BS 604 measurement responses for adjacent macro BSs, including macro PCIDs of their adjacent macro BSs.

In step 624, the target macro BS 604 updates the CSG PCI allocation range of the target macro BS 604 according to Step 2, using the macro PCIDs of the adjacent macro BSs #1 and #2 606 and 608. In step 626, the target macro BS 604 sends a CSG PCI allocation range update request to the adjacent macro BSs #1 and #2 606 and 608. Upon receiving the CSG PCI allocation range update request, the adjacent macro BSs #1 and #2 606 and 608 update CSG PCI allocation ranges of the adjacent macro BSs #1 and #2 608 according to Step 2, using PCIDs of adjacent macro BSs for the adjacent macro BSs #1 and #2 606 and 608 in step 628*a* and 628*b*, respectively. In step 630, the adjacent macro BSs #1 and #2 606 and 608 send, to the target macro BS 604, CSG PCI allocation range update responses including the updated CSG PCI allocation ranges of the adjacent macro BSs #1 and #2 606 and 608, respectively. In step 632, the target macro BS 604 updates the CSG PCI broadcast range of the target macro BS 604 according to Step 3, using the updated CSG PCI allocation range of the target macro BS 604 and the updated CSG PCI allocation ranges of the adjacent macro BSs #1 and #2 606 and 608. In steps 634*a* and 634*b*, the target macro BS 604 sends a PCI range update response indicating that the CSG PCI allocation range and the CSG PCI broadcast range of the target macro BS 604 have been updated, to the micro EMS 612 through the macro EMS 610.

In step 636, the micro EMS 612 selects one of the PCIDs included in the updated CSG PCI allocation range as a CSG PCID of the CSG BS 602. In step 638, the micro EMS 612 reports the selected CSG PCID to the CSG BS 602. Then, in step 640, the CSG BS 602 resets its CSG PCID to the selected CSG PCID.

In step 642, the target macro BS 604 transmits the updated CSG PCI broadcast range to the MS 600 as system information.

Figure 7:
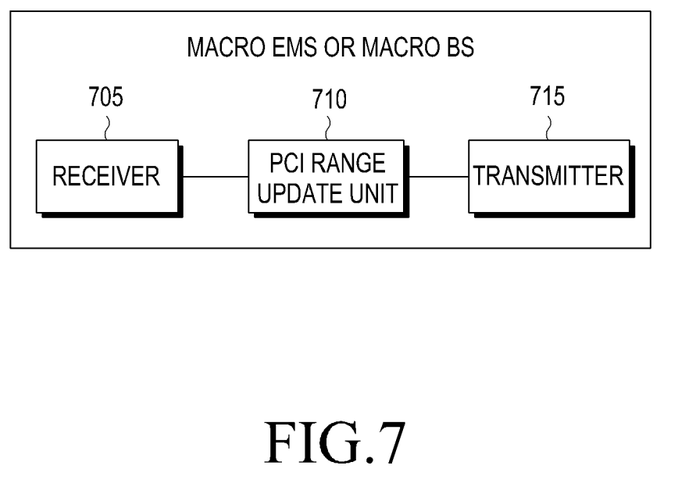
FIG. 7 illustrates a schematic structure of an apparatus for determining a CSG PCI allocation range and a CSG PCI broadcast range according to an exemplary embodiment of the present invention.

FIG. 7 illustrates a schematic structure of an apparatus for determining a CSG PCI allocation range and a CSG PCI broadcast range according to an exemplary embodiment of the present invention.

Referring to FIG. 7, the apparatus includes a receiver 705, a PCI range update unit (or a controller) 710, and a transmitter 715, and the apparatus, as described above, may correspond to one of a macro EMS and a macro BS.

First, an exemplary operation of the apparatus serving as a macro EMS will be described.

The receiver 705 receives a PCI range update request for allocation of PCIDs of CSG BSs located in a service area of a target macro BS, from an undepicted micro EMS 512, and delivers the received PCI range update request to the PCI range update unit 710.

The PCI range update unit 710 controls the transmitter 715 to transmit a scan request for adjacent macro BSs of the target macro BS to the target macro BS, and controls the receiver 705 to receive a scan response for the scanned adjacent macro BSs (hereinafter referred to as 'first adjacent macro BSs'), which is transmitted from the target macro BS. The scan response includes macro PCIDs of the first adjacent macro BSs. The PCI range update unit 710 updates management information for adjacent macro BSs of the target macro BS using macro PCIDs of the first adjacent macro BSs, and controls the transmitter 715 to transmit a scan request for adjacent macro BSs to the first adjacent macro BSs.

The PCI range update unit 710 controls the receiver 705 to receive information about adjacent macro BSs (hereinafter referred to as 'second adjacent macro BSs') of the first adjacent macro BSs, and the macro PCIDs of the second adjacent macro BSs, which are transmitted from the first adjacent macro BSs. The PCI range update unit 710 updates the CSG PCI allocation range of the target macro BS according to Step 2, using the macro PCIDs of the first adjacent macro BSs. Likewise, the PCI range update unit 710 updates the CSG PCI allocation ranges of the first adjacent macro BSs, using the PCIDs of the second macro BSs.

In addition, the PCI range update unit 710 updates a CSG PCI broadcast range of the target macro BS according to Step 3, using the updated CSG PCI allocation range of the target macro BS and the updated CSG PCI allocation ranges of the first adjacent macro BSs. The PCI range update unit 710 controls the transmitter 715 to transmit the updated CSG PCI broadcast range to the target macro BS.

Next, an operation of the apparatus serving as a macro BS will be described.

The receiver 705 receives a PCI range update request for allocation of PCIDs of CSG BSs located in a service area of a target macro BS, which is transmitted from an undepicted micro EMS 512 through a macro EMS, and delivers the received PCI range update request to the PCI range update unit 710.

The PCI range update unit 710 scans its adjacent macro BSs (hereinafter referred to as 'third adjacent macro BSs'), controls the transmitter 715 to send a scan request for adjacent macro BSs (hereinafter referred to as 'fourth adjacent macro BSs') of adjacent macro BSs of the third adjacent macro BSs to each of the third adjacent macro BSs, and controls the receiver 705 to receive macro PCIDs of the fourth adjacent macro BSs of the third adjacent macro BSs, from each of the third adjacent macro BSs. The PCI range update unit 710 updates a CSG PCI allocation range of the target macro BS according to Step 2, using the macro PCIDs of the third adjacent macro BSs. Likewise, the PCI range update unit 710 updates CSG PCI allocation ranges of the third adjacent macro BSs, using the macro PCIDs of the fourth adjacent macro BSs. The PCI range update unit 710 updates the CSG PCI broadcast range of the target macro BS according to Step 3, using the updated CSG PCI allocation range of the target macro BS and the updated CSG PCI allocation ranges of the third adjacent macro BSs. The PCI range update unit 710 controls the transmitter 715 to transmit the updated CSG PCI broadcast range to the macro EMS.

As is apparent from the foregoing description, exemplary embodiments of the present invention set the different number of PCIDs exclusively allocable to micro BSs according to the number of micro BSs installed in a macro service area in a communication system, thereby increasing the number of PCIDs allocable to micro BSs installed in the macro service area, and thus contributing to a reduction in PCI collision.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating an identifier of a Base Station (BS) in a communication system, the method comprising:
    determining a first allocation range of a macro BS including Identifiers (IDs) for at least one micro BS subscribed to a Closed Subscriber Group (CSG) using IDs of adjacent macro BSs of the macro BS;
    determining a broadcasting range using the first allocation range and a second allocation range for each of the adjacent macro BSs; and
    broadcasting information related to the broadcasting range to Mobile Stations (MSs) located in a service area of the macro BS.

2. The method of claim 1, wherein the at least one micro BS is located within the service area.

3. The method of claim 1, wherein the first allocation range is determined using a first maximum value among the IDs of the adjacent macro BSs.

4. The method of claim 3, wherein the determining of the broadcasting range comprises:
    determining a second maximum value among IDs of adjacent macro BSs located within a predetermined location from each of the adjacent macro BSs; and
    determining the broadcasting range using a minimum value between the first maximum value and the second maximum value.

5. The method of claim 1, wherein the second allocation range for each of the adjacent macro BSs including IDs for the at least one micro BS subscribed to the CSG is determined using IDs of adjacent macro BSs of a reference adjacent macro BS among the adjacent macro BSs.

6. The method of claim 1, wherein if there is a plurality of macro BSs, an allocation range of at least one macro BS among the plurality of macro BSs is different from a broadcast range of the at least one macro BS.

7. The method of claim 1, wherein the information related to the broadcasting range is included in system information received by MSs in an active mode located in the service area.

8. An apparatus for allocating an identifier of a Base Station (BS) in a communication system, the apparatus comprising:
    a controller configured to determine a first allocation range of a macro BS including Identifiers (IDs) for at least one micro BS subscribed to a Closed Subscriber Group (CSG) using IDs of adjacent macro BSs of the macro BS, determine a broadcasting range using the first allocation range and a second allocation ranges for each of the adjacent macro BSs, and control a transceiver for broadcasting information related to the broadcasting range to Mobile Stations (MSs) located in a service area of the macro BS.

9. The apparatus of claim 8, wherein the at least one micro BS is located within the service area.

10. The apparatus of claim 8, wherein the allocation range is determined using a first maximum value among the IDs of the adjacent macro BSs.

11. The apparatus of claim 10, wherein the controller is further configured to determine a second maximum value among IDs of adjacent macro BSs located within a predetermined location from each of the adjacent macro BSs, and determine the broadcasting range using a minimum value between the first maximum value and the second maximum value.

12. The apparatus of claim 8, wherein the second allocation range for each of the adjacent macro BSs including IDs for the at least one micro BS subscribed to the CSG, is determined using IDs of adjacent macro BSs of a reference adjacent macro BS among the adjacent macro BSs.

13. The apparatus of claim 8, wherein if there is a plurality of macro BSs, an allocation range of at least one macro BS among the plurality of macro BSs is different from a broadcast range of the at least one macro BS.

14. The apparatus of claim 8, wherein the information related to the broadcasting range is included in system information received by MSs in an active mode located in the service area.

15. A method for receiving information of a Base Station (BS) by a Mobile Station (MS) in a communication system, the method comprising:
  receiving information related to a broadcasting range determined using a first allocation range of a macro BS and second allocation ranges of adjacent macro BSs;
  if an Identifier (ID) of a macro BS allocated within the first allocation range is received, recognizing that the micro BS is subscribed to a Closed Subscriber Group (CSG) based on the broadcasting range,
  wherein the second allocation range is determined using IDs of the adjacent macro BSs of the macro BS.

16. The method of claim 15, wherein the first allocation range includes IDs of at least one micro BS located within a service area of the macro BS.

17. The method of claim 15, wherein the first allocation range is determined using a first maximum value among the IDs of the adjacent macro BSs.

18. The method of claim 17, wherein the broadcasting range is determined using a minimum value between the first maximum value and second maximum values, wherein each of the second maximum values is determined as a maximum value among IDs of adjacent macro BSs located within a predetermined location from each of the adjacent macro BSs.

19. The method of claim 15, wherein a second allocation range for each of the adjacent macro BSs including IDs for at least one micro BS subscribed to the CSG is determined using IDs of adjacent macro BSs of a reference adjacent macro BS among the adjacent macro BSs.

20. The method of claim 15, wherein the information related to the broadcasting range is included in system information received by MSs in an active mode located in a service area of the macro BS.

21. A Mobile Station (MS) for receiving information of a Base Station (BS) in a communication system, the method comprising:
  a transceiver configured to receive information related to a broadcasting range determined using a first allocation range of a macro BS and second allocation ranges of adjacent macro BSs; and
  if the transceiver receives an Identifier (ID) of a macro BS allocated within the first allocation range, a controller configured to recognize that the micro BS is subscribed to a Closed Subscriber Group (CSG) based on the broadcasting range,
  wherein the second allocation range is determined using IDs of adjacent macro BSs of the macro BS.

22. The MS of claim 21, wherein the first allocation range includes IDs of at least one micro BS located within a service area of the macro BS.

23. The MS of claim 21, wherein the first allocation range is determined using a first maximum value among the IDs of the adjacent macro BSs.

24. The MS of claim 23, wherein the broadcasting range is determined using a minimum value between the first maximum value and second maximum values, and
  wherein each of the second maximum values is determined as a maximum value among IDs of adjacent macro BSs located within a predetermined location from each of the adjacent macro BSs.

25. The MS of claim 21, wherein a second allocation range for each of the adjacent macro BSs including IDs for at least one micro BSs subscribed to the CSG is determined using IDs of adjacent macro BSs of a reference adjacent macro BS among the adjacent macro BS.

26. The MS of claim 21, wherein the information related to the broadcasting range is included in system information received by MSs in an active mode located in a service area of the macro BS.

* * * * *